March 28, 1939.    W. C. TROUT    2,152,508
BEARING HOLD-UP AND HOLD-DOWN
Filed June 26, 1936    2 Sheets-Sheet 1
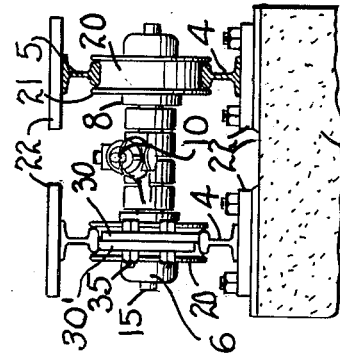
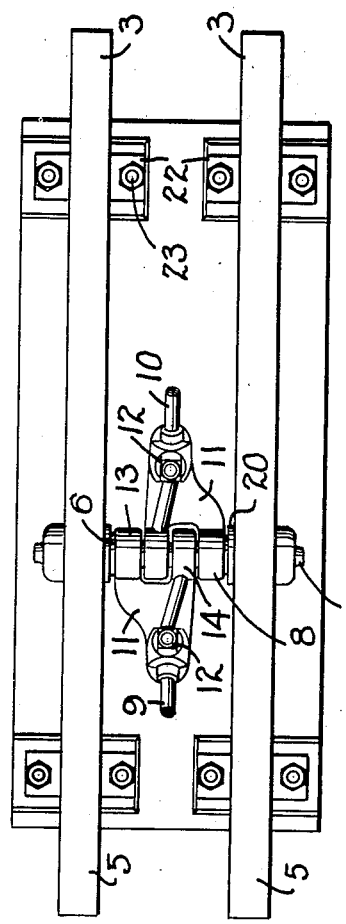
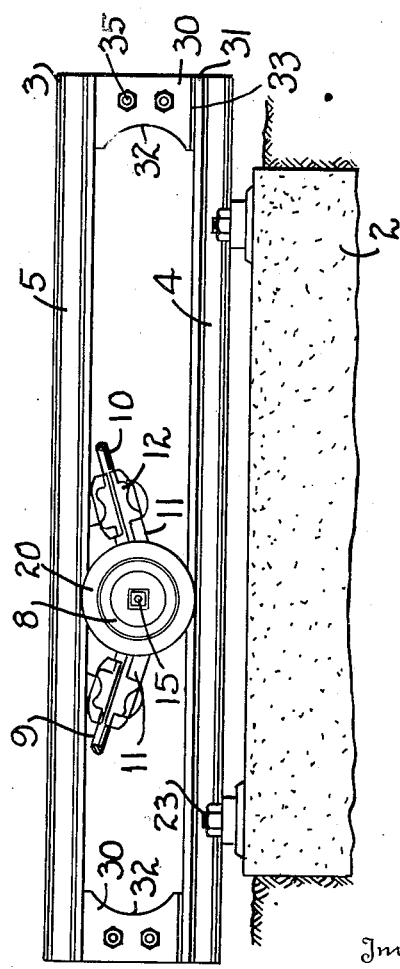
Inventor
W. C. TROUT.
Jesse R. Stone
Lester B. Clark
By
Attorneys.

March 28, 1939.　　　W. C. TROUT　　　2,152,508

BEARING HOLD-UP AND HOLD-DOWN

Filed June 26, 1936　　2 Sheets-Sheet 2

Inventor
W. C. TROUT.
Jesse R. Stone
Lester B. Clark

By

Attorneys.

Patented Mar. 28, 1939

2,152,508

UNITED STATES PATENT OFFICE 2,152,508

BEARING HOLD-UP AND HOLD-DOWN

Walter C. Trout, Lufkin, Tex., assignor to Lufkin Foundry & Machine Company, Lufkin, Tex., a corporation Application June 26, 1936, Serial No. 87,405

3 Claims. (Cl. 308—7)

The invention relates to a bearing guide which has a particular application in combination with the pull lines used in pumping oil wells.

The particular problem to be solved is illustrated generally in the patent to Hensley, 1,431,304, dated October 10, 1922, and relates to a manner of properly supporting a pull line which extends from a source of power to a well or other mechanism where the force is to be exerted. In many instances pull lines of this sort are of considerable length and must be properly supported for reciprocating movement over an uneven terrain.

In some instances the pull line must be guided over such uneven surfaces that it must be either supported against a downward pull or held down against an upward pull. Various devices have been contrived to accomplish the proper holdup and holddown of the bearing member to which the pull lines are attached, but the present invention provides a simple, compact guide for the bearing. It is one object of the invention to provide a trackway for pull line guide bearings.

Another object of the invention is to provide complementary tracks which can be assembled together to serve as a bearing guide.

Another object of the invention is to provide a roller guide for pumping power pull lines.

Other and further objects of the invention will be readily apparent when the following description is considered in connection with the accompanying drawings wherein:

Fig. 1 is a side elevation of the assembly showing the bearing as guided between the trackway.

Fig. 2 is an end view of Fig. 1.

Fig. 3 is a top plan view of Fig. 1.

Figure 5:
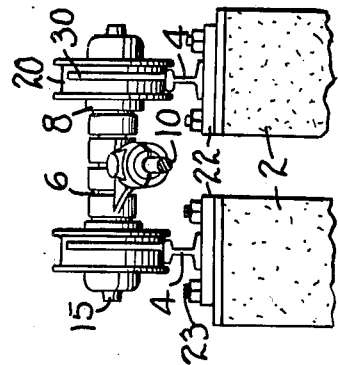
Fig. 5 is an end view of Fig. 4.

It will be understood in operating pull lines or other power transmission lines where a force is transmitted by a pull upon a wire or cable that the pull on the opposite lines is not always along the same straight line and it is therefore desirable to provide a bearing at the point where there is a change in the direction of the line.

In Fig. 1 a foundation 2 has been illustrated which serves as a support for the holdup and holddown device which is illustrated generally at 3. The present device includes the lower track 4 and the upper track 5 which make up a trackway which serves as a guide for the bearing 6. As seen in Fig. 3 there are two of these trackways 3 which are spaced apart in order to properly guide the reciprocating movement of the carriage 8 which supports the bearing 6. The pull line in Fig. 1 is illustrated by the line 9 attached to the left-hand side of the bearing and the line 10 attached to the right-hand side thereof.

In Fig. 3 the line 9 is shown as attached to a head or yoke 11 by means of the clamp 12. The yoke 11 has spaced bearing ring members 13 and 14 through which the shaft 15 passes.

The pull line 10 is attached to a similar yoke or head 11 whose spaced bearing rings are interfitted with the rings of the opposite yoke of the line 9. In this manner there is uniform support and a considerable load can be applied to the shaft 15 because of the alternate arrangement of the bearings and the fact that the opposite forces are closely adjacent each other.

The shaft 15 is suitably supported by the rollers 20, one of which is positioned in each of the trackways 3. The entire assembly of the shaft, rollers and bearing makes up the carriage 8.

In order to properly support the carriage 8 and to guide it in its reciprocating movement the tracks 4 and 5 are spaced apart at a distance in order to confine the rollers 20. As seen in Fig. 2 the tracks 4 and 5 are made up of small I-beams or rails of a suitable configuration to receive the rollers 20 whose flanges 21 extend over the head of the rail to insure proper alignment of the roller.

Fixed to the bottom rail 4 is the foundation plate 22 which can be attached to the foundation 2 by means of bolts 23.

Figure 4:
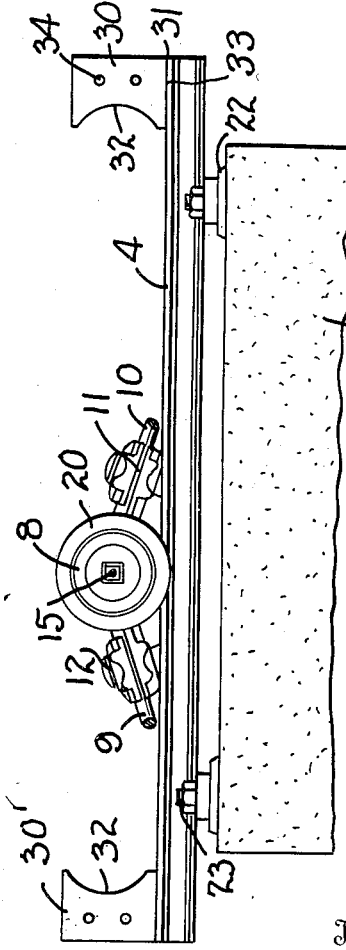
Fig. 4 is a side elevation of the mechanism used as a holdup where both of the pull lines extend from the bearing at a downward angle.

In order to make the rails interchangeable for either holdup or holddown purposes they have been constructed with spaced brackets or plates adjacent each end thereof as seen in Fig. 4 where the rail 4 has a plate 30 attached to the head portion 31 thereof at one end and an identical plate 30' at the opposite end. The plate 30 has its inner edge rounded at 32 to act as a stop for the roller 20 and has its lower edge 33 welded or otherwise fixed to the rail head 31. Suitable openings 34 to receive the attaching bolts 35 are provided. It should be noticed from Fig. 6 that the plate 30 on the right-hand end of the track 4 is adjacent the upper edge thereof, whereas the similar plate 30' at the left-hand end of the rail is adjacent the lower edge. In effect this provides right and left-handed plates, as it were, on opposite ends of the rails so that when the bottom rail 4 is positioned as seen in Fig. 1 and the top rail 5 is inserted and positioned directly above the rail 4 that the two plates 30 and 30' on the adjacent ends of the rails 4 and 5 will be overlapping and complementary, as clearly seen in the end view of Fig. 2.

The bolts 35 can then be placed through the openings 34 and the two plates 30 and 30' rigidly fixed together so as to position the rails 4 and 5 in the manner to form the trackway.

The foregoing construction is provided so that the rails may be interchangeable and may be used for the holdup, as seen in Fig. 4, or both the holdup and holddown, as seen in Fig. 1. The rails can therefore be manufactured as one piece of equipment and then either one or two of them used.

Figure 6:
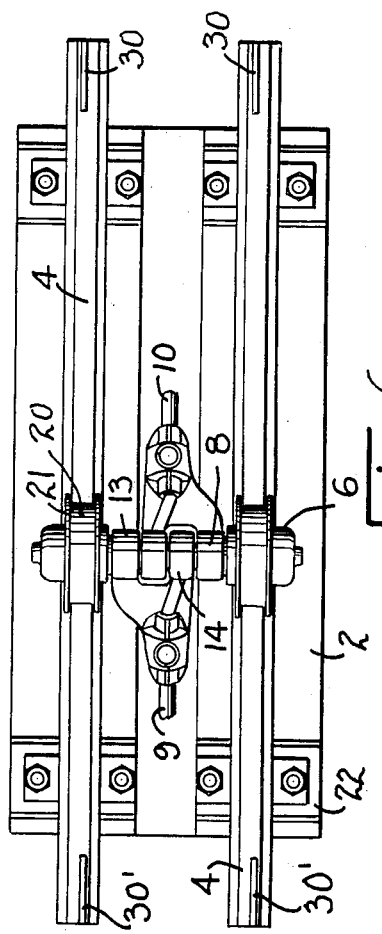
Fig. 6 is a top plan view of Fig. 4.

Figs. 4, 5 and 6 show the arrangement of the device when it is merely used as a holdup, and because of the fact that the pull lines 9 and 10 extend from the carriage 8 at a downward inclination insures that there will always be a downward pull on the carriage and no top rail is required. The top rail 5 has therefore been omitted and the plates 30 and 30' serve as stop members at the ends. The carriage, bearing and the other parts of the construction are the same in figure as previously described in connection with Fig. 1.

What I claim as new is:

1. A pull line guide comprising a trackway including top and bottom tracks, a carriage including a roller bearing disposed to travel between said tracks, means on said bearing to connect the pull line thereto, and brackets fixed to each end of each track, said brackets on adjacent ends of the tracks being overlapping and complementary, and means to fix said brackets together to space said tracks apart.

2. A combination holdup and holddown for pumping power pull lines comprising an upper track and a lower track, pull lines attached to a carriage mounted on and guided by said tracks, and stop means at each end of each track, said means comprising plates to space said tracks apart and to hold said tracks in spaced relation.

3. In a pull line guide including top and bottom rails, plates extending outwardly from the heads of said rails adjacent the ends thereof, said plates on the ends of adjacent rails of a pair being overlapping and complementary when the rail heads are oppositely disposed, and means for fixing the overlapped plates together to hold the rails in spaced relation.

WALTER C. TROUT.